United States Patent
Ozen et al.

(10) Patent No.: US 11,263,184 B1
(45) Date of Patent: Mar. 1, 2022

(54) PARTITION SPLITTING IN A DISTRIBUTED DATABASE

(71) Applicant: Amazon Technologies, Inc., Seattle, WA (US)

(72) Inventors: Mustafa Ozan Ozen, Vancouver (CA); Dumanshu Goyal, Seattle, WA (US); Lonnie J. Princehouse, Round Rock, TX (US); Gaurav Saxena, Seattle, WA (US); Atilim Cetin, Vancouver (CA); Gaurav Gupta, Sammamish, WA (US); Sandeep Bhatia, Bothell, WA (US); Nilesh Shahdadpuri, Issaquah, WA (US); Timothy A. Rath, Des Moines, WA (US); Eric Coll, Bothell, WA (US); Nirmesh Khandelwal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 580 days.

(21) Appl. No.: 16/116,791

(22) Filed: Aug. 29, 2018

(51) Int. Cl.
| | | |
|---|---|---|
| *G06F 16/00* | (2019.01) | |
| *G06F 16/21* | (2019.01) | |
| *G06F 16/27* | (2019.01) | |
| *G06F 16/2458* | (2019.01) | |
| *G06F 16/248* | (2019.01) | |

(Continued)

(52) U.S. Cl.
CPC ......... *G06F 16/211* (2019.01); *G06F 16/219* (2019.01); *G06F 16/2477* (2019.01); *G06F 16/278* (2019.01); *G06F 16/248* (2019.01); *G06F 16/24573* (2019.01); *G06F 16/9024* (2019.01)

(58) Field of Classification Search
CPC ............... G06F 16/278; G06F 16/219; G06F 16/24573; G06F 16/2477; G06F 16/248; G06F 16/9024
See application file for complete search history.

(56) References Cited

U.S. PATENT DOCUMENTS

| | | | |
|---|---|---|---|
| 8,276,154 B2 | 9/2012 | Toub et al. | |
| 8,930,312 B1 * | 1/2015 | Rath | ............ G06F 16/278 707/634 |

(Continued)

OTHER PUBLICATIONS

U.S. Appl. No. 17/349,786, dated Jun. 16, 2021, Sudipto Das.
U.S. Appl. No. 17/349,790, dated Jun. 16, 2021, Sudipto Das.

*Primary Examiner* — Vincent F Boccio
(74) *Attorney, Agent, or Firm* — Robert C. Kowert; Kowert, Hood, Munyon, Rankin & Goetzel, P.C.

(57) ABSTRACT

Methods, systems, and computer-readable media for partition splitting in a distributed database are disclosed. A partition of data is split into a first sub-partition and a second sub-partition. A first portion of the data is assigned to the first sub-partition, and a second portion of the data is assigned to the second sub-partition. One or more elements of the first portion of the data from the partition and an additional one or more elements of the first portion of the data from the first sub-partition are stored into a first node. One or more elements of the second portion of the data from the partition and an additional one or more elements of the second portion of the data from the second sub-partition are stored into a second node. The partition is prevented from receiving new data after the partition is split into the first and second sub-partitions.

20 Claims, 8 Drawing Sheets

(51) Int. Cl.
 *G06F 16/901* (2019.01)
 *G06F 16/2457* (2019.01)

(56) References Cited

U.S. PATENT DOCUMENTS

| | | |
|---|---|---|
| 9,286,001 B2 | 3/2016 | Skjolsvold et al. |
| 9,607,019 B1 | 3/2017 | Swift et al. |
| 9,626,374 B2 | 4/2017 | Hirsch et al. |
| 9,836,492 B1 | 12/2017 | Hermanson |
| 2015/0149413 A1* | 5/2015 | Lee .................. G06F 16/23 707/643 |

* cited by examiner

PARTITION SPLITTING IN A DISTRIBUTED DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
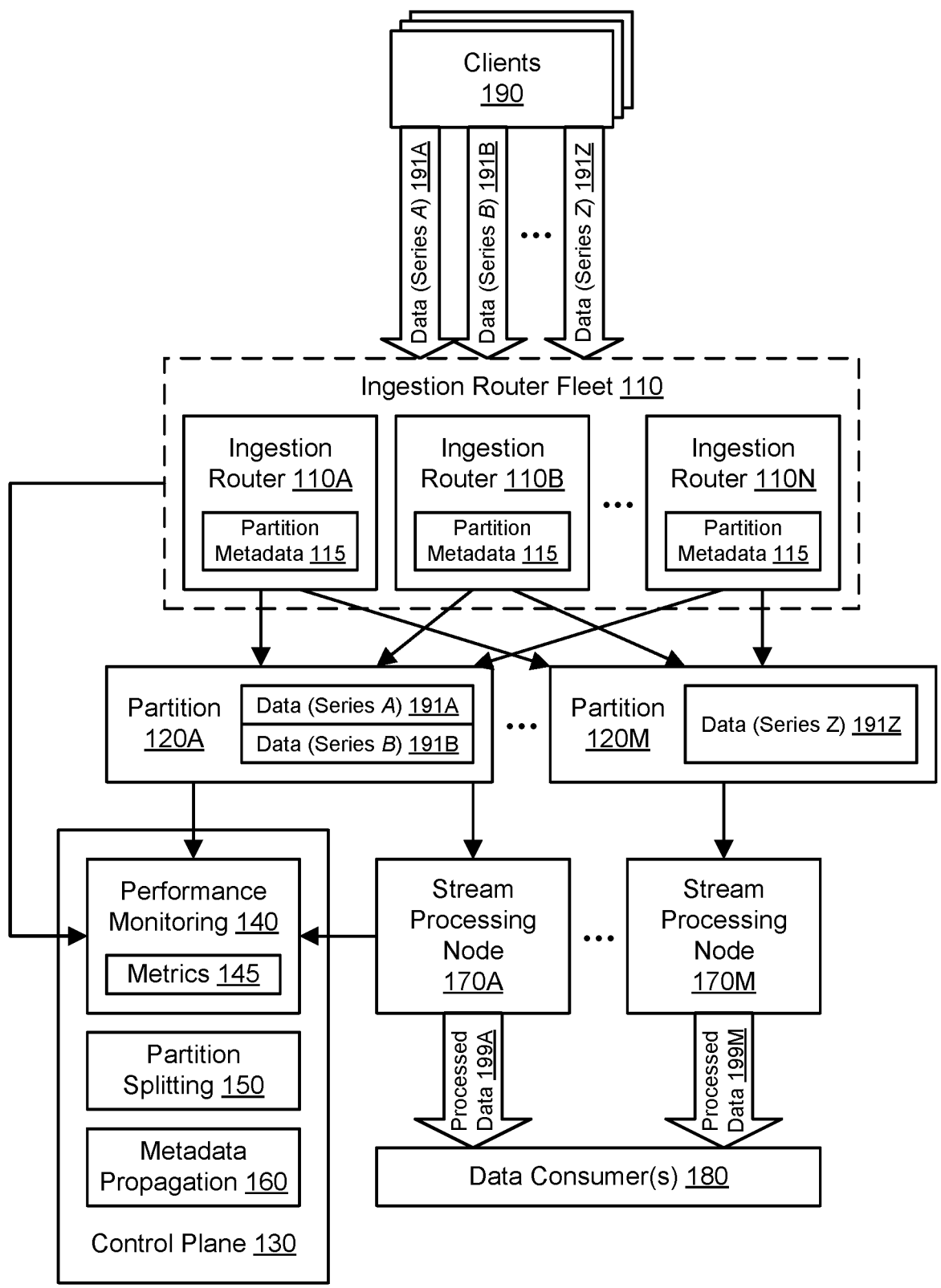
FIG. 1 illustrates an example system environment for partition splitting in a distributed database, including a steady state prior to a split of a parent partition into two sub-partitions, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for partition splitting in a distributed database are described. In one embodiment, a distributed database may include a set of stream processors, also referred to as nodes, that process data in a distributed manner. In one embodiment, for example, a node may perform reordering, deduplication, and other transformations on time series data before sending the data to storage locations. In one embodiment, it is beneficial for elements of data belonging to a particular time series to be processed by the same node so that reordering and deduplication can be performed efficiently. In one embodiment, a partition split may be performed such that data from a particular series is routed to the same node. In one embodiment, the data may represent one or more streams of data that are routed to various partitions using a fleet of ingestion routers. In one embodiment, the ingestion routers may use partition metadata that represents a mapping of different series (or other non-overlapping portions of the data stream) to different partitions. In one embodiment, one or more series or other portions of the data stream(s) may be assigned to a particular partition, and one node may be assigned to that partition to process the partition's data. In one embodiment, a partition split may be triggered by analysis of node metrics, e.g., if node throughput reaches or exceeds a threshold value. In one embodiment, at least two sub-partitions (also referred to as child partitions) may be created in a split of a parent partition. In one embodiment, of the data originally assigned to the parent partition, one portion may be reassigned to one sub-partition, and the other portion may be reassigned to the other sub-partition. In one embodiment, data from one sub-partition may be provided to one node, and data from the other sub-partition may be provided to the other node. In one embodiment, updated partition metadata that represents the new assignment of series or ranges of data to partitions (including the new sub-partitions) may be propagated to the fleet of ingestion routers. In one embodiment, the propagation of the updated partition metadata may take time, such that some routers may be using the updated metadata while other routers are using the stale partition metadata. In one embodiment, while the split is in an intermediate state, a node may receive data both from the parent partition and from the corresponding sub-partition. In one embodiment, the parent partition may be "walled" and prevented from receiving new data at some point after the split, e.g., when a threshold percentage of routers have received the updated metadata. In one embodiment, after the remaining data in the parent partition is provided to the node(s), the parent partition may be decommissioned. In one embodiment, the split may then be complete, and the distributed database may again be in a steady state. In one embodiment, using the techniques described herein, data belonging to a particular series or other portion of a range may be routed to the same stream processor node, even while a split is being performed.

FIG. 1 illustrates an example system environment for partition splitting in a distributed database, including a steady state prior to a split of a parent partition into two sub-partitions, according to one embodiment. In one embodiment, one or more streams of data may be provided to a distributed database by a set of clients 190. In one embodiment, the distributed database may divide a range of data into non-overlapping partitions such as partition 120A through partition 120M. In one embodiment, each partition may be assigned one or more time series or other portion of data, such that elements of data belonging to a particular series or portion of the data may be assigned to one and only one partition while the distributed database is in a steady state. In one embodiment, time series data may include a stream or sequence of data elements that have timestamps as well as tags and/or other metadata. In one embodiment, different series or portions of the data may be assigned to different partitions based on tags or other values associated with the data, and the data may be said to be spatially partitioned. In one embodiment, a partition may include one series or multiple series. In one embodiment, for example, series A data 191A and series B data 191B may be assigned to partition 120A, while series Z data 191Z may be assigned to partition 120M. In one embodiment, for example, the data may be partitioned based on the region that produced the data, on the category to which the data belongs, and/or on other suitable metadata.

In one embodiment, a fleet 110 of ingestion routers (such as router 110A and 110B through 110N) may take elements of data 191A-191Z published by client 190 and route those elements to appropriate partitions 120A-120M. In one embodiment, the data may be routed based on partition metadata 115. In one embodiment, the partition metadata 115 may represent a mapping of series or portions of the data to different partitions. In one embodiment, for example, the partition metadata 115 may indicate that series A data 191A and series B data 191B are assigned to partition 120A, while series Z data 191Z is assigned to partition 120M. In one embodiment, when an ingestion router receives a new element of data published by a client, the router may refer to the partition metadata 115 to determine where to route the element of data. In one embodiment, the data may be routed to a database table associated with the partition and managed by a database subsystem or service. In one embodiment, the partitions 120A-120M may be implemented using any suitable data structures and computational resources. In one embodiment, the partitions 120A-120M may be implemented as shards of a streaming subsystem or service. In one embodiment, the data may be provided from the database table to one or more shards representing the appropriate partition.

In one embodiment, the distributed database may include a set of stream processing nodes 170A-170M (also referred to as stream processors or nodes) that process data in a distributed manner. In one embodiment, for example, a node may perform reordering, deduplication, aggregation of different time periods, and other transformations on time series data before sending the data to data consumer(s) 180. In one embodiment, the distributed database may have a one-to-one mapping of partitions to nodes, e.g., such that partition 120A is processed by node 170A (and not by any other nodes) while partition 120M is processed by node 170M (and not by any other nodes). In one embodiment, by restricting a given series or portion of the data to a single stream processing node, tasks such as reordering and deduplication may be simplified. In one embodiment, as shown in FIG. 1, node 170A may produce processed data 199A while node 170M may produce processed data 199M. In one embodiment, the data consumer(s) 180 may provide the processed data to one or more storage subsystems or storage services that may then store the processed data in appropriate storage locations. In one embodiment, the processed data may be stored in different tiers, such as a hot tier and a cold tier that represent different levels of demand for the data.

In one embodiment, FIG. 1 may depict a steady state prior to a partition split. In one embodiment, a partition split may be performed such that data from a particular series is routed to the same node during the split. In one embodiment, a control plane 130 may manage partition splits. In one embodiment, the control plane 130 may be associated with the nodes 170A-170M. In one embodiment, the control plane 130 may be associated with the partitions 120A-120M. In one embodiment, the control plane 130 may include a performance monitoring component 140. In one embodiment, the performance monitoring component 140 may receive or generate one or more metrics 145. In one embodiment, the one or more metrics 145 may relate to the performance and/or usage of particular nodes of the distributed database. In one embodiment, for example, the metric(s) 145 may indicate the throughput of data for the stream processing node 170A over a period of time. In one embodiment, for example, the metric(s) 145 may indicate the utilization of memory resources or processor resources for the stream processing node 170A over a period of time. In one embodiment, the one or more metrics 145 may relate to the performance and/or usage of one or more routers in the fleet 110. In one embodiment, the one or more metrics 145 may relate to the performance and/or usage of one or more of the partitions 120A-120M.

In one embodiment, the control plane 130 may include a partition splitting component 150. In one embodiment, the control plane 130 may monitor the metric(s) and initiate a partition split if the metric(s) associated with a particular node (such as node 170A) or partition (such as partition 120A) merit a split. In one embodiment, for example, a split of the corresponding partition 120A may be initiated by the partition splitting component 150 if the throughput, memory utilization, or processor utilization at the node 170A meets or exceeds a predetermined threshold value. In one embodiment, the partition split may be initiated if the resources of the node 170A are being strained by the increasing traffic associated with the corresponding partition 120A. In one embodiment, as will be discussed below, the control plane 130 may perform metadata propagation 160 to update the partition metadata 115 in connection with a partition split.

In one embodiment, the partitions 120A-120M and/or stream processing nodes 170A-170M of a distributed database may be implemented using resources of a provider network. In one embodiment, the provider network may represent a network set up by an entity such as a private-sector company or a public-sector organization to provide one or more services (such as various types of network-accessible computing or storage) accessible via the Internet and/or other networks to a distributed set of clients. In one embodiment, the provider network may include numerous services that collaborate according to a service-oriented architecture to provide resources such as the distributed database having the partitions 120A-120M and/or stream processing nodes 170A-170M. In one embodiment, the provider network may include numerous data centers hosting various resource pools, such as collections of physical and/or virtualized computer servers, storage devices, networking equipment and the like, that are used to implement and distribute the infrastructure and services offered by the provider. In one embodiment, compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In one embodiment, the distributed database may be implemented as a service of the provider network, the service may be implemented using a plurality of different instances that are distributed throughout one or more networks, and each instance may offer access to the functionality of the service to various clients. In one embodiment, because resources of the provider network may be under the control of multiple clients (or tenants) simultaneously, the provider network may be said to offer multi-tenancy and may be termed a multi-tenant provider network. In one embodiment, the functionality of the provider network, such as the stream processors 170A-170M, may be offered to clients in exchange for fees.

Figure 8:
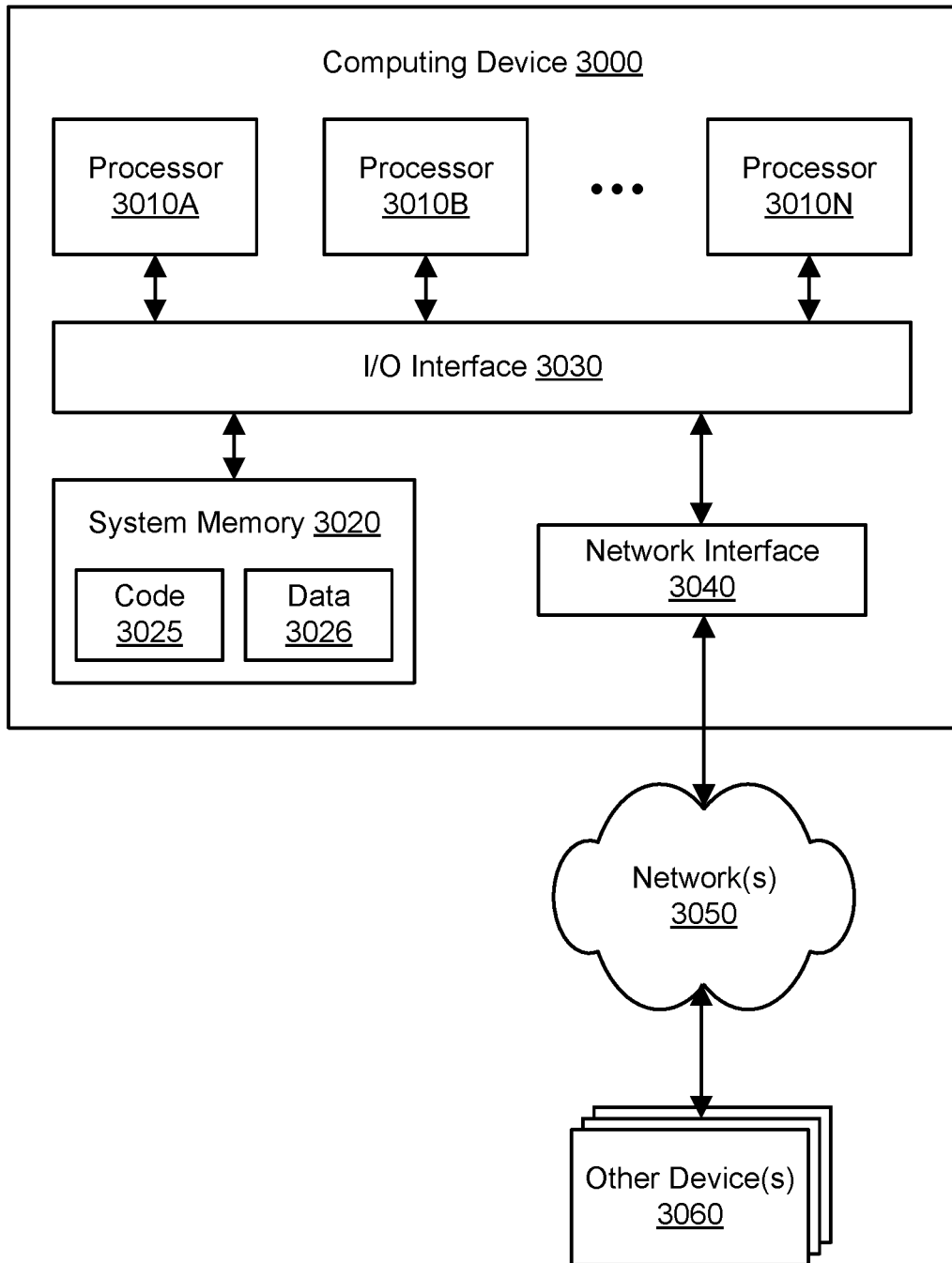
FIG. 8 illustrates an example computing device that may be used in some embodiments.

In one embodiment, components of the distributed database, such as the ingestion router fleet 110, control plane 130, partitions 120A-120M, stream processing nodes 170A-170M, and or data consumer(s) 180, may be implemented using any suitable number and configuration of computing devices, any of which may be implemented by the example computing device 3000 illustrated in FIG. 8. In some embodiments, the computing devices may be located in any suitable number of data centers or geographical locations. In various embodiments, at least some of the functionality of the distributed database may be provided by the same computing device or by different computing devices. In various embodiments, if any of the components of the distributed database are implemented using different computing devices, then the components and their respective computing devices may be communicatively coupled, e.g., via one or more networks. In one embodiment, any of the components of the distributed database may represent any combination of software and hardware usable to perform their respective functions. In some embodiments, operations implemented by the distributed database may be performed automatically, e.g., without a need for user initiation or user intervention after an initial configuration stage, and/or programmatically, e.g., by execution of program instructions on at least one computing device. In some embodiments, the distributed database may include additional components not shown, fewer components than shown, or different combinations, configurations, or quantities of the components shown.

In one embodiment, clients 190 of the distributed database may represent external devices, systems, or entities with respect to the database. In one embodiment, the client devices may be implemented using any suitable number and configuration of computing devices, any of which may be implemented by the example computing device 3000 illustrated in FIG. 8. In one embodiment, clients 190 may convey network-based service requests to the ingestion router fleet 110 via one or more networks, e.g., to supply a stream of data for processing using the nodes 170A-170M. In various embodiments, the network(s) may encompass any suitable combination of networking hardware and protocols necessary to establish network-based communications between client devices and the distributed database. In one embodiment, for example, the network(s) may generally encompass the various telecommunications networks and service providers that collectively implement the Internet. In one embodiment, the network(s) may also include private networks such as local area networks (LANs) or wide area networks (WANs) as well as public or private wireless networks. In one embodiment, for example, both a given client device and the distributed database may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database. In one embodiment, client devices may communicate with the distributed database using a private network rather than the public Internet. In various embodiments, the various components of the distributed database may also communicate with other components of the distributed database using one or more network interconnects.

In one embodiment, the techniques described herein may achieve the technical advantage of reducing the latency of a partition split. In one embodiment, the techniques described herein may achieve the technical advantage of improving the read availability of data following a partition split. In one embodiment, the techniques described herein may achieve the technical advantage of simplifying the processing of data (e.g., reordering and/or deduplication) involved in a partition split. In one embodiment, the techniques described herein may achieve the technical advantage of improving the consistency of data in a partition split. In one embodiment, the techniques described herein may achieve the technical advantage of improving the scalability of a distributed database.

Figure 2:
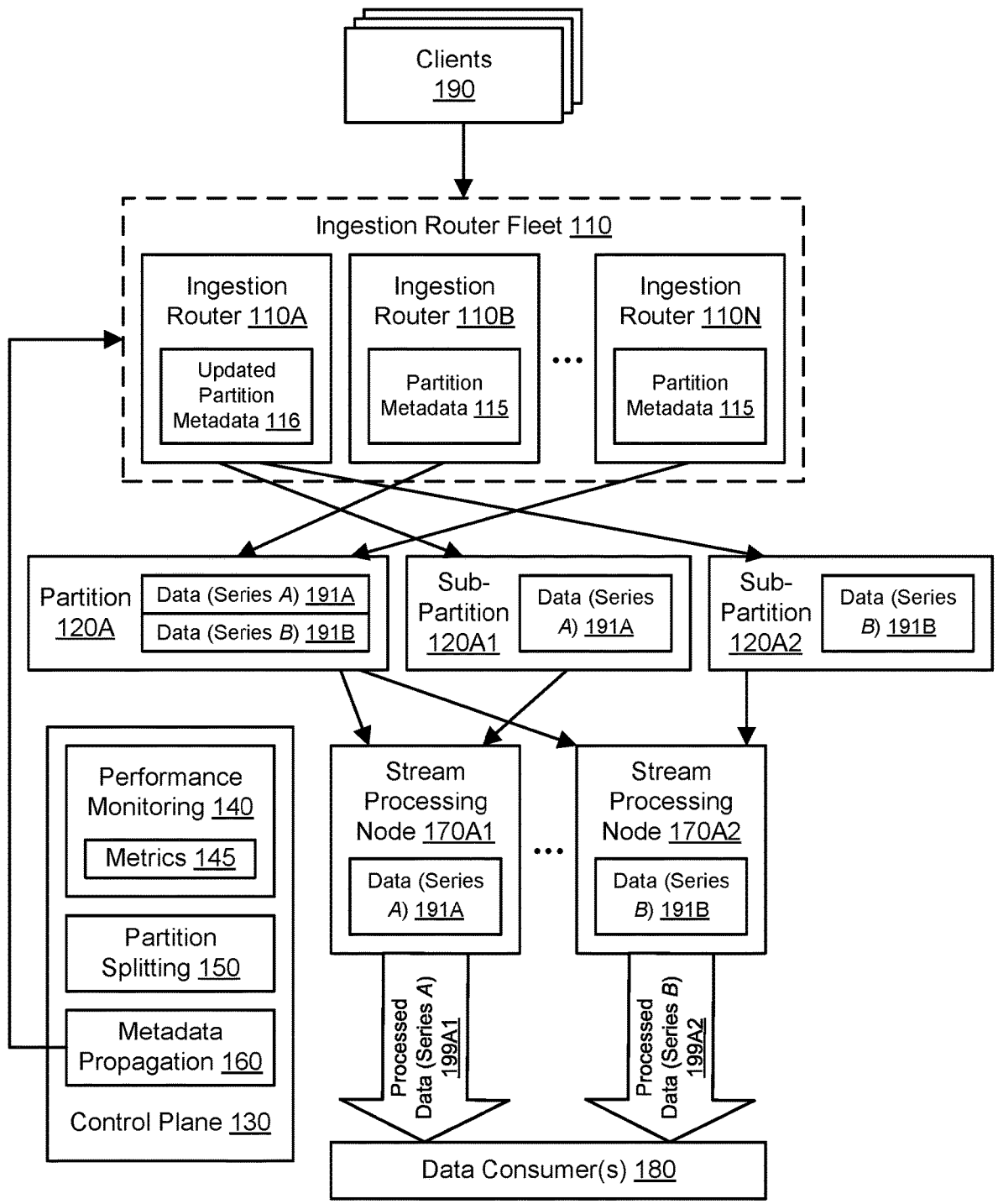
FIG. 2 illustrates further aspects of the example system environment for partition splitting in a distributed database, including an intermediate state in which the parent partition and also the sub-partitions are receiving new data, according to one embodiment.

FIG. 2 illustrates further aspects of the example system environment for partition splitting in a distributed database, including an intermediate state in which the parent partition and also the sub-partitions are receiving new data, according to one embodiment. In one embodiment, FIG. 2 may depict an intermediate or "fuzzy" state during a partition split. In one embodiment, at least two sub-partitions (also referred to as child partitions) may be created in a split of a parent partition. In one embodiment, for example, partition 120A may be split into sub-partition 120A1 and sub-partition 120A2. In one embodiment, the sub-partitions 120A1 and 120A2 may be implemented using the same data structures or technologies as the parent partition 120A, e.g., as shards of a stream management service.

In one embodiment, of the data originally assigned to the parent partition, one portion may be reassigned to one sub-partition, and the other portion may be reassigned to the other sub-partition. In one embodiment, for example, series A data 191A may be assigned to sub-partition 120A1, while series B data 191B may be assigned to sub-partition 120A2, and series Z data 191Z (not shown in FIG. 2) may remain with partition 120M. In one embodiment, the range of data originally assigned to the parent partition 120A may be divided between the sub-partitions 120A1 and 120A2 in a best effort at a substantially even manner, such that approximately half the data is assigned to one sub-partition while the other half is assigned to the other sub-partition. In one embodiment, such an even division may be more likely with a greater number of series assigned to the parent partition 120A. In one embodiment, each of the new sub-partitions 120A1 and 120A2 may be assigned to a stream processing node. In one embodiment, as shown in FIG. 2, sub-partition 120A1 may be assigned to node 170A1 while sub-partition 120A2 may be assigned to node 170A2. In one embodiment, both the nodes 170A1 and 170A2 may be provisioned, reserved, or otherwise created from a pool of computing resources, e.g., as offered by a provider network. In one embodiment, either the node 170A1 or 170A2 may re-use the node 170A previously associated with the parent partition 120A.

In one embodiment, the control plane 130 may generate updated partition metadata 116. In one embodiment, the updated partition metadata 116 may represent the new assignment of series or ranges of data to partitions (including the new sub-partitions 120A1 and 120A2). In one embodiment, using the metadata propagation component 160, the control plane may begin providing the updated partition metadata 116 to the ingestion router fleet 110. In one embodiment, the propagation of the updated partition metadata 116 may take time, such that some routers may be using the updated metadata while other routers are using the stale partition metadata. In one embodiment, at one point in time, the ingestion router 110A may have the updated partition metadata 116 while the routers 110B and 110N have the old metadata 115. In one embodiment, the updated router 110A may properly route series A data 191A to sub-partition 120A1 and series B data 191B to sub-partition 120A2, while the routers 110B and 110N with stale metadata 115 may continue to route both series A data 191A and series B data 191B to the parent partition 120A.

In one embodiment, while the split is in this intermediate state, a node may receive data both from the parent partition 120A and from the corresponding sub-partition. In one embodiment, as shown in FIG. 2, the node 170A1 may receive series A data 191A from both the parent partition 120A and also from the corresponding sub-partition 120A1, while the node 170A2 may receive series B data 191B from both the parent partition 120A and also from the corresponding sub-partition 120A2. In one embodiment, using the techniques described herein, all series A data 191A may be routed to a single stream processing node 170A1 during the partition split, while all series B data 191A may be routed to a single stream processing node 170A2 during the partition split. In one embodiment, each node may efficiently perform various transformation and aggregation tasks on a particular series or other portion of the data provided by clients 190 without having to coordinate with other nodes. In one embodiment, the node 170A1 may provide processed series A data 199A1 to one or more downstream consumers 180, while the node 170A2 may provide processed series B data 199A2 to the one or more downstream consumers.

Figure 3:
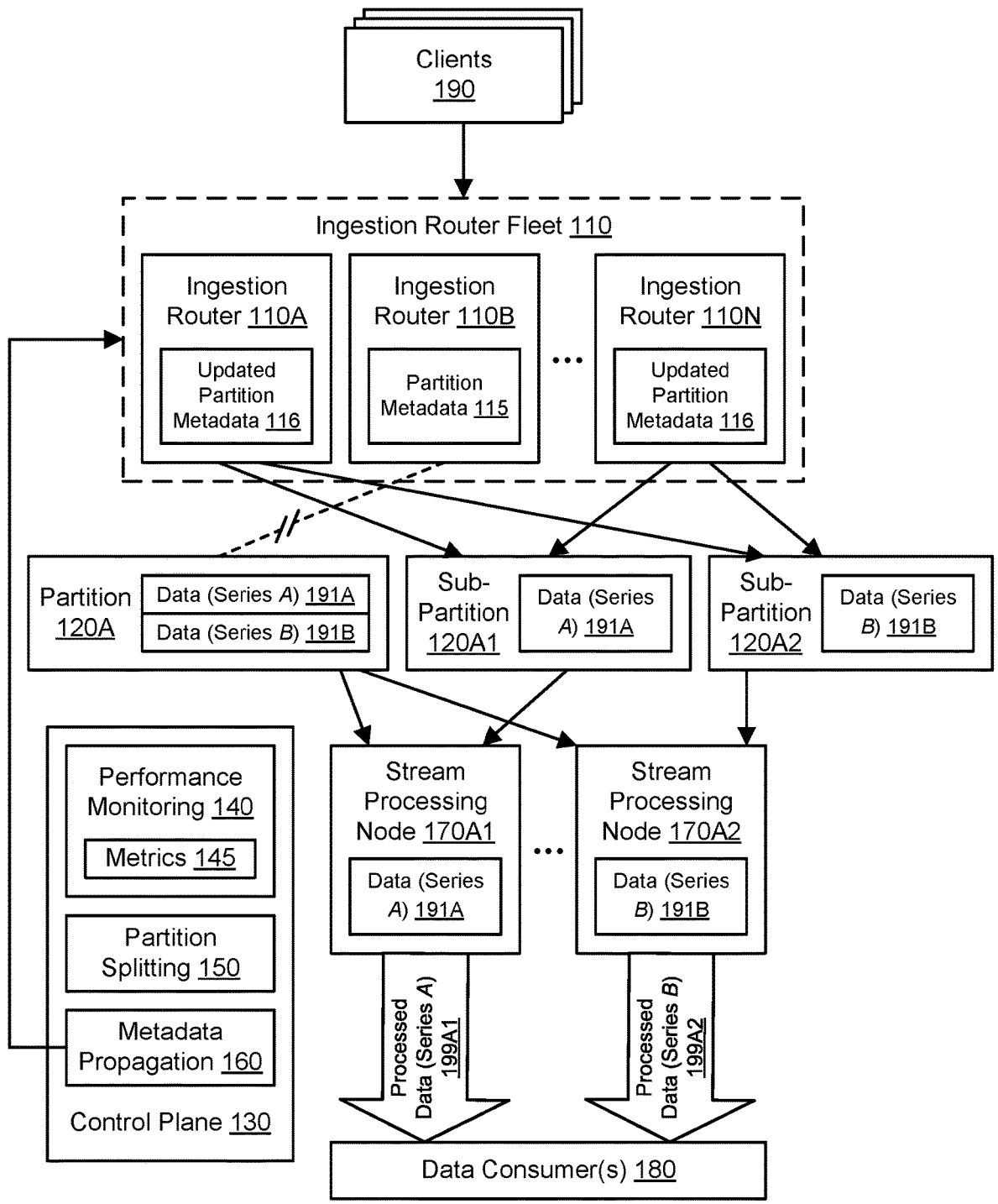
FIG. 3 illustrates further aspects of the example system environment for partition splitting in a distributed database, including a cleanup state in which the parent partition is prevented from receiving new data, according to one embodiment.

FIG. 3 illustrates further aspects of the example system environment for partition splitting in a distributed database, including a cleanup state in which the parent partition is prevented from receiving new data, according to one embodiment. In one embodiment, FIG. 3 may depict a cleanup state during a partition split. In one embodiment, the propagation of the updated partition metadata 116 may take time, such that some routers may be using the updated metadata while other routers are using the stale partition metadata. In one embodiment, at one point in time illustrated by FIG. 3, the ingestion routers 110A and 110N may have the updated partition metadata 116 while the router 110B has the old metadata 115. In one embodiment, the updated routers 110A and 110N may properly route series A data 191A to sub-partition 120A1 and series B data 191B to sub-partition 120A2, while the router 110B with stale metadata 115 may attempt to route both series A data 191A and series B data 191B to the parent partition 120A.

In one embodiment, during the cleanup state, the parent partition 120A may be "walled" and prevented from receiving new data from any routers (such as router 110B) that are using the stale partition metadata 115. In one embodiment, the parent partition 120A may be walled when a relevant metric has met or exceeded a threshold value. In one embodiment, the parent partition 120A may be walled when a threshold percentage of routers, such as 99%, have received the updated metadata 116. In one embodiment, the parent partition 120A may be walled when a sufficient length of time has passed that a threshold percentage of routers, such as 99%, are expected to have received the updated metadata 116. In one embodiment, the parent partition 120A may be walled by modifying an authorization or authentication configuration to prohibit writes to the partition or a corresponding database table. In one embodiment, after the partition 120A has been prevented from receiving new data, any existing data in the partition may continue to be provided to the relevant node as discussed above.

In one embodiment, the nodes 170A1 and 170A2 may checkpoint the last data in the parent partition 120A. In one embodiment, after the remaining data in the parent partition 120A has been provided to the nodes 170A1 and 170A2, the parent partition may be decommissioned. In one embodiment, decommissioning the partition 120A may include clearing or deallocating any data structures (such as shards of a streaming system) such that the partition can no longer be accessed by the nodes 170A1 and 170A2. In one embodiment, the split may then be considered complete, and the distributed database may again enter a steady state.

Figure 4:
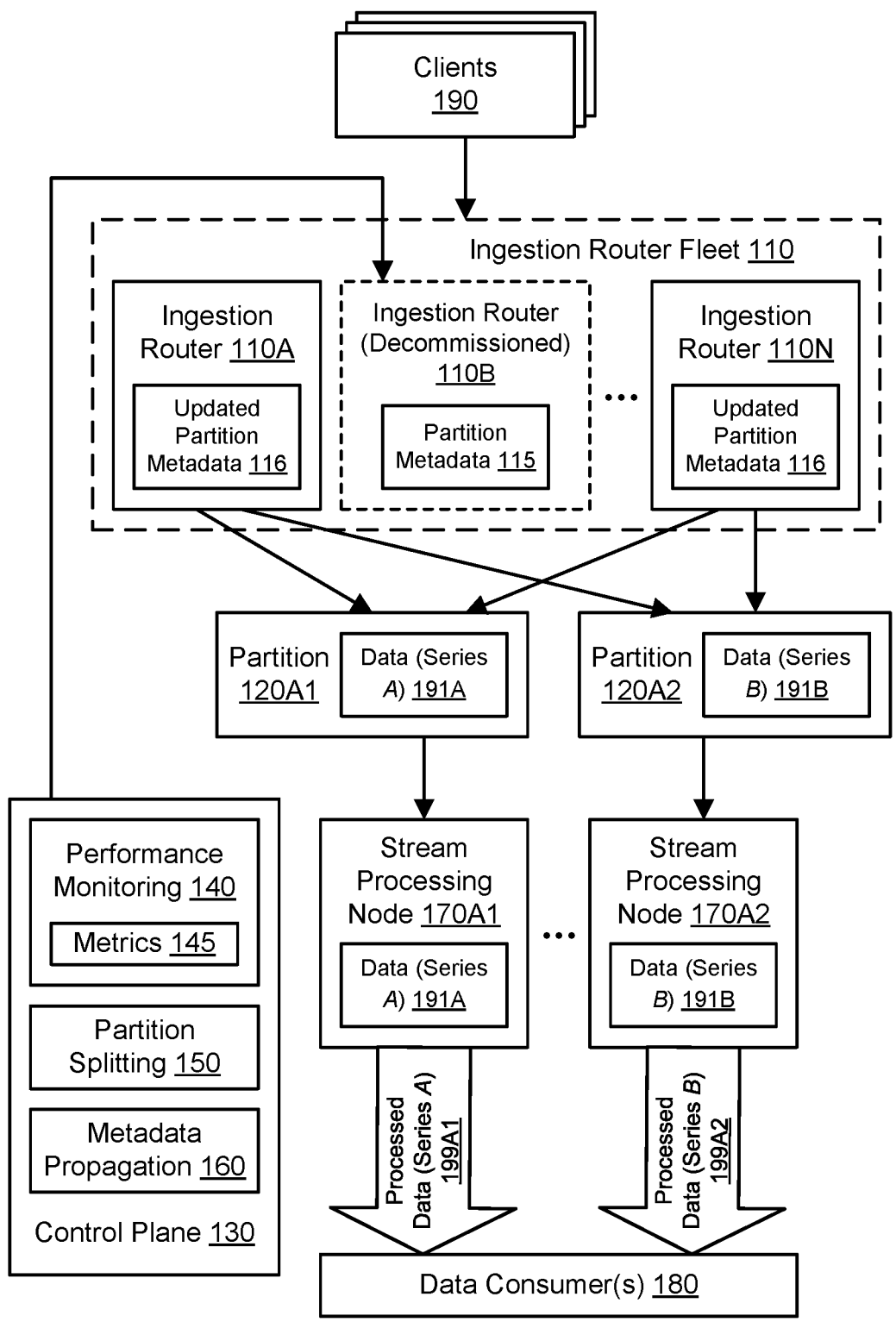
FIG. 4 illustrates further aspects of the example system environment for partition splitting in a distributed database, including a steady state with two sub-partitions, according to one embodiment.

FIG. 4 illustrates further aspects of the example system environment for partition splitting in a distributed database, including a steady state with two sub-partitions, according to one embodiment. In one embodiment, FIG. 4 may depict a steady state following a partition split. In one embodiment, any routers that were not updated with the new partition metadata 116, such as router 110B, may be decommissioned. In one embodiment, decommissioning the router 110B may include deprovisioning any computing resources or returning the resources to a pool of a provider network such that the router can no longer receive data from clients 190 or provide data to the partitions of the distributed database. In one embodiment, one or more new routers may be added to the fleet 110 and provided with the updated metadata 116.

In one embodiment, after completion of the split, the distributed database may treat the sub-partitions 120A1 and 120A2 not as special cases but in the same manner as other partitions such as partition 120M. In one embodiment, another partition split may be triggered for one or more of the sub-partitions 120A1 and 120A2, e.g., when the metrics 145 indicate that the resources of a corresponding node are becoming sufficiently constrained. In one embodiment, a sub-partition may be split again (into two or more sub-partitions) during the steady state shown in FIG. 4. In one embodiment, a sub-partition may be split again (into two or more sub-partitions) during the cleanup state shown in FIG. 3. In one embodiment, a partition split may be completed in minutes, and data associated with the split may be quickly made available to consumers. In one embodiment, by repeatedly splitting partitions in the manner described herein, a distributed database may go from one partition to approximately a million partitions in as little as an hour.

Figure 5:
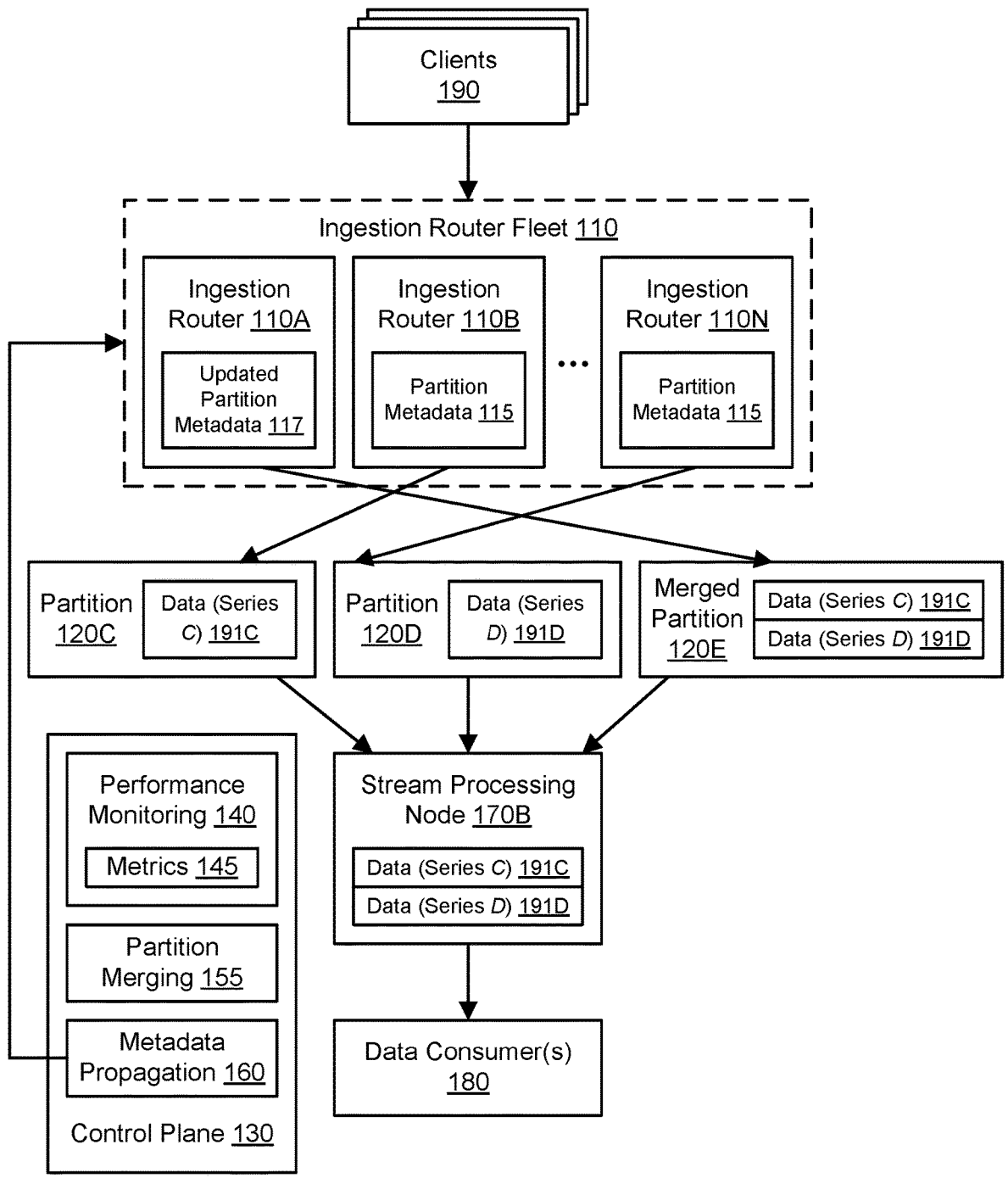
FIG. 5 illustrates an example system environment for partition merging in a distributed database, according to one embodiment.

FIG. 5 illustrates an example system environment for partition merging in a distributed database, according to one embodiment. In one embodiment, the control plane 130 may include a partition merging component 155. In one embodiment, the partition merging 155 may cause two or more partitions, such as partitions 120C and 120D, to be combined into a merged partition 120E. In one embodiment, the partition merging 155 may be triggered by one or more metrics 145. In one embodiment, for example, the partition merging 155 may be initiated if the throughput or memory utilization at two or more nodes drops below a predetermined threshold value such that the nodes are being underutilized.

In one embodiment, the series or portions of data assigned to each of the partitions 120C and 120D may be reassigned to the merged partition 120E. In one embodiment, as discussed above with respect to partition splitting, updated partition metadata 117 that represents the new mapping of series to partitions may be propagated to the router fleet 110. In one embodiment, as also discussed above, some of the router fleet 110 (such as router 110A) may receive and use the updated metadata 117 before others in the fleet (such as routers 110B and 110N). In one embodiment, the merged partition 120E may be assigned to a single node 170B, and that node may read data from both the original partitions 120C and 120D and the merged partition 120E during an intermediate or "fuzzy" state shown in FIG. 5. In one embodiment, the original partitions 120C and 120D may be walled (and eventually decommissioned) based on an appropriate metric, so that they no longer provide data to the node 170B. In one embodiment, for example, the partitions 120C and 120D may be walled when a threshold percentage of the router fleet 110 have received the updated partition metadata 117. In one embodiment, the partition merge may then enter a cleanup state and finally a steady state.

Figure 6:
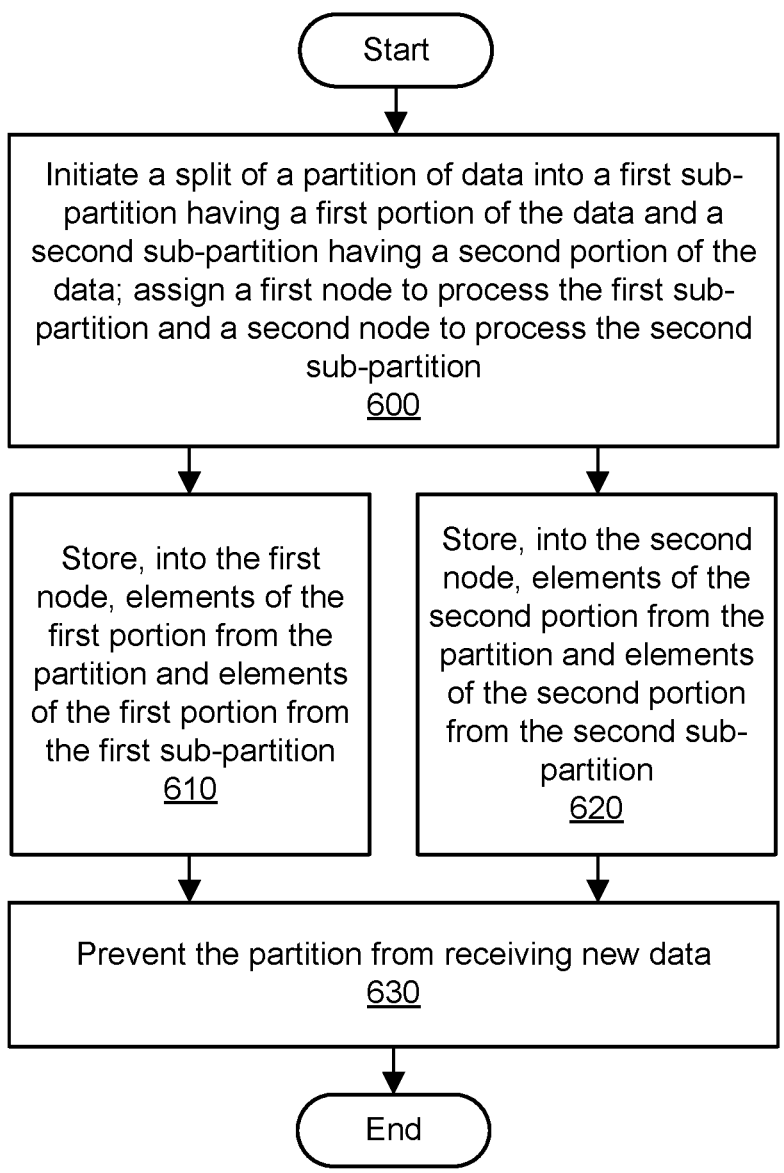
FIG. 6 is a flowchart illustrating a method for partition splitting in a distributed database, according to one embodiment.

FIG. 6 is a flowchart illustrating a method for partition splitting in a distributed database, according to one embodiment. In one embodiment, as shown in 600, a split of a partition of data may be initiated. In one embodiment, the split may produce a first sub-partition and a second sub-partition. In one embodiment, a range of data associated with the original partition may be divided among the first and second sub-partitions in a non-overlapping manner, such that a first portion of the data is associated with the first sub-partition and a second portion of the data is associated with the second sub-partition. In one embodiment, the data may be spatially partitioned between the sub-partition, e.g., according to tags or other metadata associated with individual elements of the data. In one embodiment, the data may include a plurality of time series, and a particular time series may be assigned to one and only one sub-partition in the partition split. In one embodiment, a first stream processing node may be assigned to process the first sub-partition, and a second stream processing node may be assigned to process the second sub-partition. In one embodiment, more than two sub-partitions may be generated in a split of a single original partition, and each sub-partition may have its own dedicated stream processing node.

In one embodiment, during an intermediate or "fuzzy" state of the partition split, data for a particular series or portion may be routed to the original partition and also one of the sub-partitions. In one embodiment, as shown in 610, elements of the first portion of data (e.g., one or more time series assigned to the first sub-partition) may be stored into the first node from both the original partition and the first sub-partition assigned to the node. In one embodiment, as shown in 620, elements of the second portion of data (e.g., one or more time series assigned to the second sub-partition) may be stored into the second node from both the original partition and the second sub-partition assigned to the node. In one embodiment, by restricting a particular portion or series of the incoming data to a single stream processing node, the processing of that portion or series may be substantially simplified, e.g., to perform re-ordering, deduplication, aggregation, and other transformation tasks, and the processed data may be made available to consumers more quickly.

In one embodiment, as shown in 630, the original partition may be prevented from receiving new data at some point after the partition split is initiated. In one embodiment, during a cleanup state of the partition split, the original partition may be "walled" and prevented from receiving new data, e.g., from any routers that are not yet aware of the split. In one embodiment, the partition may be walled when a threshold percentage of routers, such as 99%, have received updated partition metadata associated with the split. In one embodiment, the partition may be walled when a sufficient length of time has passed that a threshold percentage of routers, such as 99%, are expected to have received the updated metadata. In one embodiment, after the partition has been prevented from receiving new data, any existing data in the partition may continue to be provided to the relevant node as discussed above. In one embodiment, after the remaining data in the parent partition has been provided to the first and second nodes, the parent partition may be decommissioned. In one embodiment, the split may then be considered complete, and the distributed database may again enter a steady state.

Figure 7:
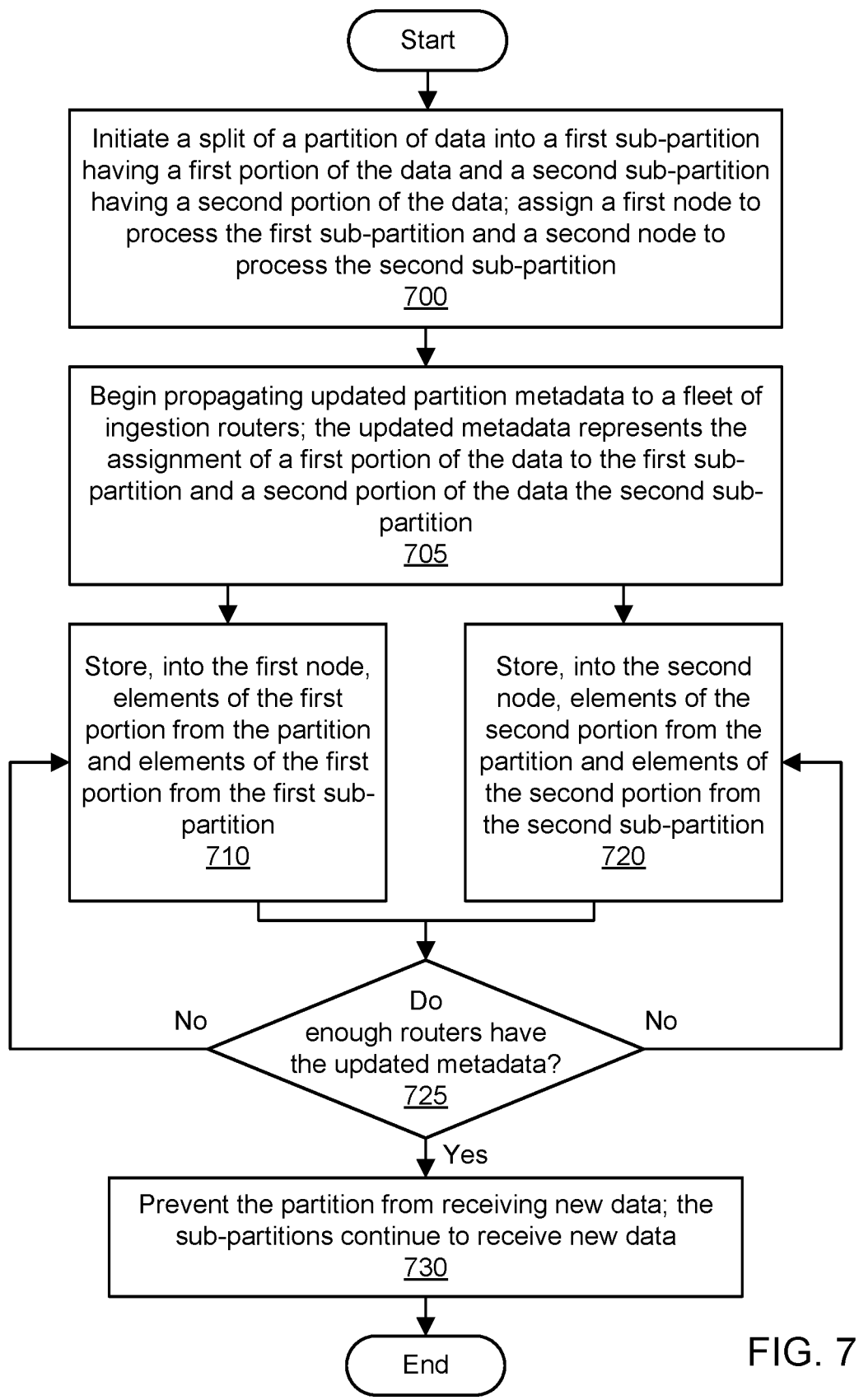
FIG. 7 is a flowchart illustrating a method for partition splitting in a distributed database, including propagating updated partition metadata to a fleet of ingestion routers, according to one embodiment.

FIG. 7 is a flowchart illustrating a method for partition splitting in a distributed database, including propagating updated partition metadata to a fleet of ingestion routers, according to one embodiment. In one embodiment, as shown in 700, a split of a partition of data may be initiated. In one embodiment, the split may produce a first sub-partition and a second sub-partition. In one embodiment, a range of data associated with the original partition may be divided among the first and second sub-partitions in a non-overlapping manner, such that a first portion of the data is associated with the first sub-partition and a second portion of the data is associated with the second sub-partition. In one embodiment, the data may be spatially partitioned between the sub-partition, e.g., according to tags or other metadata associated with individual elements of the data. In one embodiment, the data may include a plurality of time series, and a particular time series may be assigned to one and only one sub-partition in the partition split. In one embodiment, a first stream processing node may be assigned to process the first sub-partition, and a second stream processing node may be assigned to process the second sub-partition. In one embodiment, more than two sub-partitions may be generated in a split of a single original partition, and each sub-partition may have its own dedicated stream processing node.

In one embodiment, as shown in 705, the method may generate updated partition metadata that represent the new assignment of portions of data to partitions (including the new sub-partitions). In one embodiment, the updated partition metadata may be propagated to a fleet of routers that take data from clients and send the data to appropriate partitions. In one embodiment, the propagation of the updated partition metadata may take time, such that some routers may be using the updated metadata while other routers are using the stale partition metadata during an intermediate or "fuzzy" state of the partition split.

In one embodiment, while the split is in this intermediate state, a node may receive data both from the original partition and from the corresponding sub-partition. In one embodiment, as shown in 710, elements of the first portion of data (e.g., one or more time series assigned to the first sub-partition) may be stored into the first node from both the original partition and the first sub-partition assigned to the node. In one embodiment, as shown in 720, elements of the second portion of data (e.g., one or more time series assigned to the second sub-partition) may be stored into the second node from both the original partition and the second sub-partition assigned to the node. In one embodiment, by restricting a particular portion or series of the incoming data to a single stream processing node, the processing of that portion or series may be substantially simplified, e.g., to perform re-ordering, deduplication, aggregation, and other transformation tasks, and the processed data may be made available to consumers more quickly.

In one embodiment, as shown in 725, the method may determine whether a sufficient number of routers have the updated partition metadata. In one embodiment, a sufficient number of routers may be 99% of the router fleet. In one embodiment, the method may estimate that a sufficient number of routers have received the updated metadata after a particular duration of time has elapsed. In one embodiment, if not enough routers have the updated metadata, then the method may return to 710 and 720. In one embodiment, if enough routers have the updated metadata, then the method may proceed to 730.

In one embodiment, as shown in 730, the original partition may be prevented from receiving new data at some point after the partition split is initiated. In one embodiment, during a cleanup state of the partition split, the original partition may be "walled" and prevented from receiving new data, e.g., from any routers that are not yet aware of the split. In one embodiment, the first and second sub-partitions may continue to receive new data and provide that data to the corresponding nodes. In one embodiment, after the original partition has been prevented from receiving new data, any existing data in the partition may continue to be provided to the relevant node as discussed above. In one embodiment, after the remaining data in the parent partition has been provided to the first and second nodes, the parent partition may be decommissioned. In one embodiment, the split may then be considered complete, and the distributed database may again enter a steady state.

Illustrative Computer System

In at least some embodiments, a computer system that implements a portion or all of one or more of the technologies described herein may include a computer system that includes or is configured to access one or more computer-readable media. FIG. 8 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of routers;
   one or more processors; and
   memory to store computer-executable instructions that, if executed, cause the one or more processors to:
   split a partition of data into a first sub-partition and a second sub-partition, wherein a first portion of the data is assigned to the first sub-partition and a second portion of the data is assigned to the second sub-partition, and wherein the data is routed to the partition by the plurality of routers responsive to partition metadata;
   provide updated partition metadata to the plurality of routers, wherein the updated partition metadata represents an assignment of the first portion of the data to the first sub-partition and an assignment of the second portion of the data to the second sub-partition;
   cause one or more elements of the first portion of the data from the partition and an additional one or more elements of the first portion of the data from the first sub-partition to be stored into a first node;
   cause one or more elements of the second portion of the data from the partition and an additional one or more elements of the second portion of the data from the second sub-partition to be stored into a second node;
   prevent the partition from receiving new data after splitting the partition into the first sub-partition and the second sub-partition; and
   decommission the partition after preventing the partition from receiving the new data.

2. The system as recited in claim 1, wherein the partition is prevented from receiving the new data responsive to a metric associated with the plurality of routers receiving the updated partition metadata.

3. The system as recited in claim 1, wherein the one or more elements of the first portion of the data and the one or more elements of the second portion of the data are received at the partition from one or more of the routers lacking the updated partition metadata, wherein the additional one or more elements of the first portion of the data are received at the first sub-partition from one or more of the routers having the updated partition metadata, and wherein the additional one or more elements of the second portion of the data are received at the second sub-partition from the one or more of the routers having the updated partition metadata.

4. The system as recited in claim 1, wherein the computer-executable instructions, if executed, cause the one or more processors to:
   transform, using the first node, at least a subset of the one or more elements of the first portion of the data and the additional one or more elements of the first portion of the data; and
   transform, using the second node, at least a subset of the one or more elements of the second portion of the data and the additional one or more elements of the second portion of the data.

5. A method, comprising:
   splitting a partition of data into a first sub-partition and a second sub-partition, wherein a first portion of the data is assigned to the first sub-partition and a second portion of the data is assigned to the second sub-partition;
   causing one or more elements of the first portion of the data from the partition and an additional one or more elements of the first portion of the data from the first sub-partition to be stored into a first node;
   causing one or more elements of the second portion of the data from the partition and an additional one or more elements of the second portion of the data from the second sub-partition to be stored into a second node; and preventing the partition from receiving new data after splitting the partition into the first sub-partition and the second sub-partition.

6. The method as recited in claim 5, wherein the data is routed to the partition by a plurality of routers responsive to partition metadata, and wherein the method further comprises:

providing the plurality of routers with updated partition metadata, wherein the updated partition metadata represents an assignment of the first portion of the data to the first sub-partition and an assignment of the second portion of the data to the second sub-partition.

7. The method as recited in claim 6, wherein the partition is prevented from receiving the new data responsive to a metric associated with the routers receiving the updated partition metadata.

8. The method as recited in claim 5, further comprising:
initiating a split of the partition responsive to one or more performance metrics associated with processing the partition.

9. The method as recited in claim 5, wherein the partition comprises a plurality of time series, wherein the first portion assigned to the first sub-partition comprises a first one or more time series, and wherein the second portion assigned to the second sub-partition comprises a second one or more time series.

10. The method as recited in claim 5, further comprising:
merging a first partition of the data and a second partition of the data into a merged partition;
storing data from the first partition, data from the second partition, and data from the merged partition into a third node;
preventing the first and second partitions from receiving elements of the data after merging the first and second partitions of data into the merged partition.

11. The method as recited in claim 5, further comprising:
reordering, using the first node, at least a subset of the one or more elements of the first portion of the data and the additional one or more elements of the first portion of the data; and
reordering, using the second node, at least a subset of the one or more elements of the second portion of the data and the additional one or more elements of the second portion of the data.

12. The method as recited in claim 5, further comprising:
deduplicating, using the first node, at least a subset of the one or more elements of the first portion of the data and the additional one or more elements of the first portion of the data; and
deduplicating, using the second node, at least a subset of the one or more elements of the second portion of the data and the additional one or more elements of the second portion of the data.

13. The method as recited in claim 5, further comprising:
sending, from the first node to a first set of one or more storage locations, at least a subset of the one or more elements of the first portion of the data and the additional one or more elements of the first portion of the data; and
sending, from the second node to a second set of one or more storage locations, at least a subset of the one or more elements of the second portion of the data and the additional one or more elements of the second portion of the data.

14. The method as recited in claim 5, further comprising:
decommissioning the partition after preventing the partition from receiving the new data.

15. A non-transitory computer-readable storage medium to store program instructions that, if executed, cause one or more processors to perform:

initiating a split of a partition of data into a first sub-partition and a second sub-partition, wherein a first portion of the data is assigned to the first sub-partition and a second portion of the data is assigned to the second sub-partition, and wherein the data is routed to the partition by a plurality of routers responsive to partition metadata;

providing updated partition metadata to the plurality of routers, wherein the updated partition metadata represents an assignment of the first portion of data to the first sub-partition and an assignment of the second portion of data to the second sub-partition;

causing one or more elements of the first portion of the data from the partition and an additional one or more elements of the first portion of the data from the first sub-partition to be stored into a first node;

causing one or more elements of the second portion of the data from the partition and an additional one or more elements of the second portion of the data from the second sub-partition to be stored into a second node; and preventing the partition from receiving new data after splitting the partition into the first sub-partition and the second sub-partition.

16. The non-transitory computer-readable storage medium as recited in claim 15, wherein the one or more elements of the first portion of the data and the one or more elements of the second portion of the data are received at the partition from one or more of the routers lacking the updated partition metadata, wherein the additional one or more elements of the first portion of the data are received at the first sub-partition from one or more of the routers having the updated partition metadata, and wherein the additional one or more elements of the second portion of the data are received at the second sub-partition from the one or more of the routers having the updated partition metadata.

17. The non-transitory computer-readable storage medium as recited in claim 15, wherein the partition is prevented from receiving the new data responsive to a threshold percentage of the routers receiving the updated partition metadata.

18. The non-transitory computer-readable storage medium as recited in claim 15, wherein the partition comprises a plurality of time series, wherein the first portion assigned to the first sub-partition comprises a first one or more time series, and wherein the second portion assigned to the second sub-partition comprises a second one or more time series.

19. The non-transitory computer-readable storage medium as recited in claim 15, wherein the program instructions, if executed, cause the one or more processors to perform:
decommissioning the partition after preventing the partition from receiving the new data.

20. The non-transitory computer-readable storage medium as recited in claim 15, wherein the program instructions, if executed, cause the one or more processors to perform:

aggregating, using the first node, at least a subset of the one or more elements of the first portion of the data and the additional one or more elements of the first portion of the data; and aggregating, using the second node, at least a subset of the one or more elements of the second portion of the data and the additional one or more elements of the second portion of the data.

\* \* \* \* \*